United States Patent [19]

Kiwalle

[11] 3,896,985

[45] July 29, 1975

[54] INDEXING APPARATUS FOR ROTARY MACHINE TOOL

[75] Inventor: Jozef Kiwalle, Peoria, Ill.

[73] Assignee: Production Technology Inc., Peoria, Ill.

[22] Filed: Oct. 25, 1972

[21] Appl. No.: 300,482

[52] U.S. Cl. .................................................. 228/2
[51] Int. Cl.² ......................................... B23K 27/00
[58] Field of Search ......... 91/41, 42, 358, 361, 410; 228/2

[56] References Cited
UNITED STATES PATENTS

| | | | |
|---|---|---|---|
| 3,235,161 | 2/1966 | Cooper | 228/2 |
| 3,435,614 | 4/1969 | Ledeen et al. | 91/361 |
| 3,479,924 | 11/1969 | Ferguson | 91/358 R |
| 3,548,487 | 12/1970 | Stamm | 228/2 X |
| 3,570,740 | 3/1971 | Stamm | 228/2 |
| 3,593,522 | 7/1971 | Angert et al. | 91/42 |
| 3,616,980 | 11/1971 | Padilla | 228/2 |
| 3,732,027 | 5/1973 | Lupke et al. | 91/410 |
| 3,739,974 | 6/1973 | Kiwalle et al. | 228/2 |
| 3,743,162 | 7/1973 | Gage | 228/2 |
| 3,750,927 | 8/1973 | Miller et al. | 228/2 |
| 3,776,446 | 12/1973 | Gage et al. | 228/2 |

*Primary Examiner*—Martin P. Schwadron
*Assistant Examiner*—Abraham Hershkovitz
*Attorney, Agent, or Firm*—Phillips, Moore, Weissenberger, Lempio & Strabala

[57] ABSTRACT

An indexing apparatus for a rotary machine tool, preferably embodied as a friction welding machine, to rapidly and accurately position a rotatable chuck in a selected angular position. To facilitate movement of the chuck toward its selected position, a motor driving the chuck at a relatively high speed is responsive to signal means for initially reducing the operating speed of the motor and then stopping the motor and the chuck as the chuck approaches its selected angular position. In one embodiment, the position of the chuck is preferably sensed by one or more pressure switches each in communication with an outlet orifice directed toward an apertured plate arranged for rotation with the chuck. With the chuck being driven by a hydraulic motor, the chuck is accurately located in its selected angular position by means which block an outlet passage of the motor to provide braking action for both the motor and the chuck. In another embodiment, the position of the chuck is sensed by a light sensing electrical circuit.

10 Claims, 4 Drawing Figures

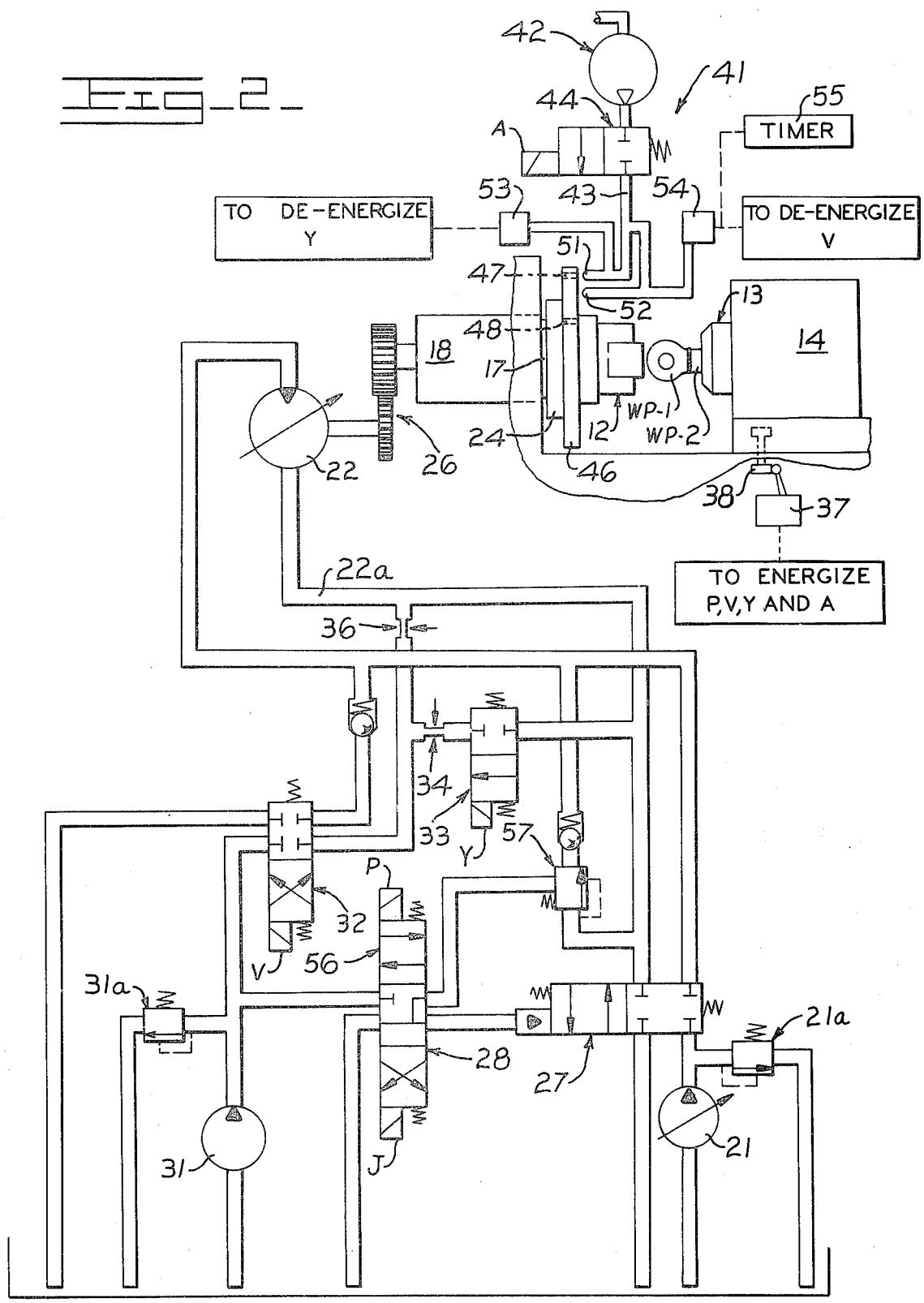

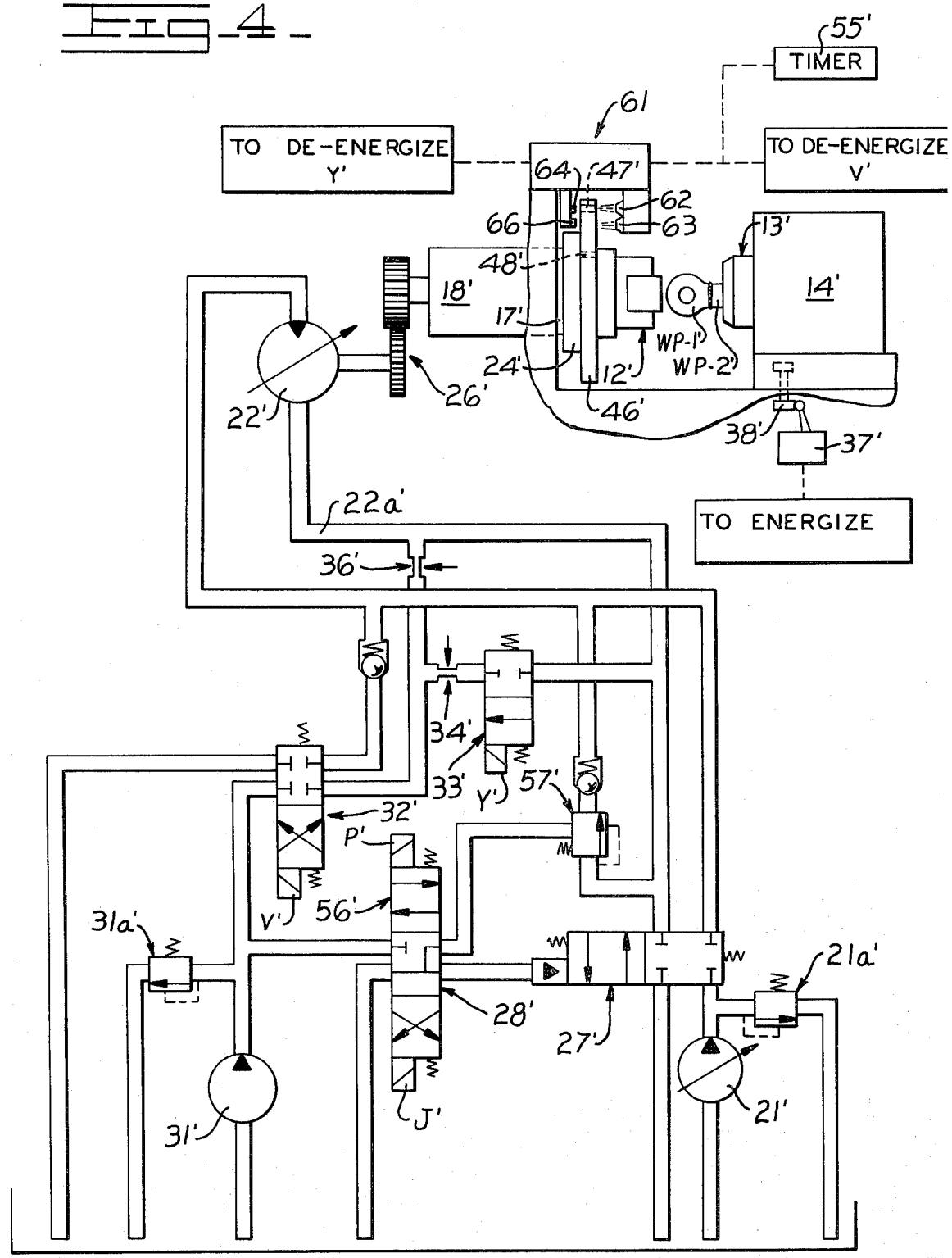

INDEXING APPARATUS FOR ROTARY MACHINE TOOL

BACKGROUND OF THE INVENTION

The present invention relates to an indexing or orientation apparatus for a rotary machine tool and more particularly to such apparatus for positioning a chuck in a selected angular position at the end of the work cycle. The indexing apparatus of the present invention is particularly adaptable to a friction welding machine in order to facilitate the automatic loading and unloading of workpieces from a rotatable chuck.

SUMMARY OF THE INVENTION

It is an initial object of the present invention to provide indexing apparatus for a rotary machine tool in order to rapidly locate a rotatable chuck in a selected angular position.

To accomplish this object, the invention contemplates motor means operable at a relatively high speed for rotating the chuck towards its selected angular position, a signal means reducing the speed of the motor as the chuck approaches its selected position and another signal means stopping rotation of the chuck in its selected angular position.

It is another object of the invention to provide indexing apparatus for accurately positioning a chuck in a selected angular position.

To accomplish this object, the invention provides a chuck being driven by a hydraulic motor, signal means sensing approach of the chuck toward a selected angular position and thereupon causing the motor to stop rotation, an outlet passage from the motor also being blocked to thereby brake the motor and accurately stop the chuck in its selected angular position.

Additional objects and advantages of the present invention are made apparent in the following description having reference to the accompanying drawings.

BRIEF DESCRIPTION OF THE DRAWINGS

FIG. 2 is a fragmentary representation, in schematic form, of a chuck and operating motor for the friction welding machine of FIG. 1 together with indexing apparatus according to the present invention.

FIG. 4 is a view similar to FIG. 2 and illustrates another embodiment of the present invention, particularly the circuit for sensing the angular position of the chuck.

DESCRIPTION OF A PREFERRED EMBODIMENT

Figure 1:
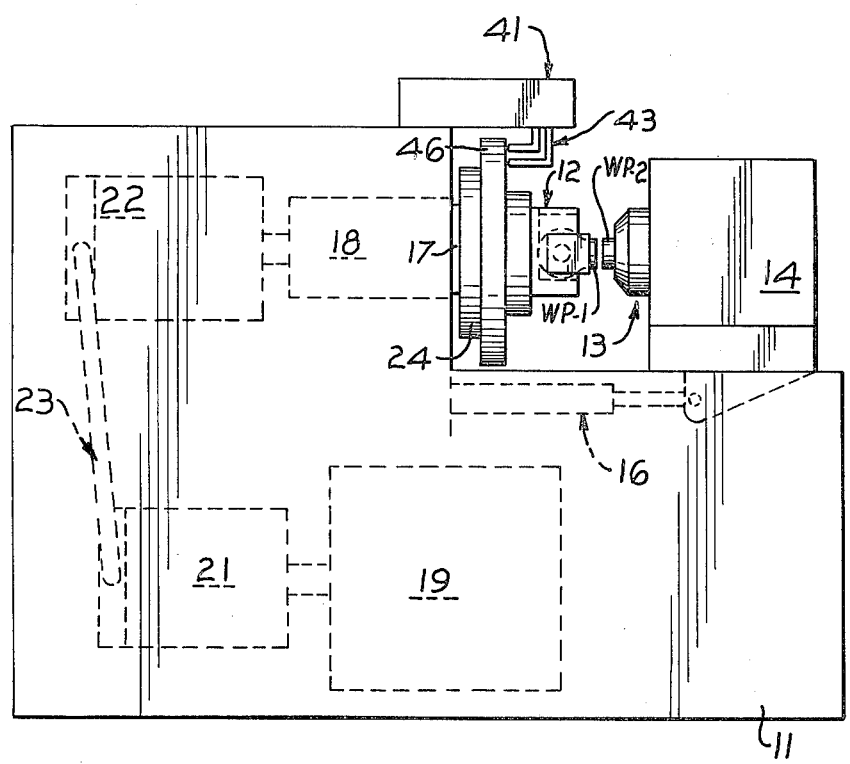
FIG. 1 is a side elevation view, in partially diagrammatic form, of a friction welding machine.

A friction welding machine is illustrated in FIG. 1 as an exemplary setting for the indexing apparatus of the present invention. However, it will be apparent from the following description that the indexing apparatus is equally adaptable to other rotary machine tools.

Referring now to FIG. 1, the friction welding machine includes a frame 11 with two parts to be bonded, workpieces WP-1 and WP-2, mounted respectively within chucks 12 and 13. The chuck 13 is secured against rotation upon a tailstock fixture or assembly 14. The tailstock fixture 14 is mounted for axial movement on the machine frame either toward or away from the chuck 12 under the influence of a hydraulic load cylinder 16. The cylinder 16 is operable to urge the workpieces into axially abutting engagement at the commencement of a welding operation or to retract the tailstock fixture from the rotatable chuck 12 at the completion of a welding cycle.

The chuck 12 is mounted for rotation on a spindle 17 which is supported upon the machine frame by a bearing assembly 18. An electric motor 19 rotates the spindle 17 through a hydrostatic transmission including a hydraulic pump 21, a hydraulic motor 22 and a manifold 23 between the pump and the motor.

One or more inertial weights 24 may be mounted for rotation with the spindle 17 in accordance with conventional inertial welding techniques.

Referring momentarily to FIG. 2, it may be seen that the hydraulic motor 22 is positively coupled with the spindle 17 through a mechanical gear train indicated at 26.

The motor 22, being hydraulically operable, is suitable for variable speed operation in accordance with the present invention.

Referring now to FIG. 2, fluid under pressure is communicated from the pump 21 past a conventional relief valve 21a to the motor 22 by a main control valve 27 which is in turn operable by a pilot valve assembly 28. The pilot valve 28 is in turn responsive to a solenoid indicated at J.

The pump 21 provides a relatively large volume of fluid for operating the motor 22 under normal conditions. However, as the indexing apparatus of the present invention is set in motion, the pump 21 is blocked from theh motor 22 by closure of the control valve 27 in a manner described in greater detail below.

A small fluid pump 31 also in communication with a relief valve 31a, is selectively communicated with the motor 22 by a control valve 32 which is respectively positioned by an electrical solenoid indicated at V. When fluid is communicated from the pump 31 to the motor 22 across the valve 32, the motor is caused to rotate at a speed determined by variable orifices indicatd at 34 and 36. The orifices 34 and 36 provide an outlet path for the motor 22 as discussed in greater detail below. A valve 33, positioned by a solenoid Y, either blocks the orifice 34 or places it in parallel communication with the orifice 36. With fluid exiting from the motor 22 across both of the orifices 34 and 36, the motor operates at a relatively higher speed, for example, approximately 60 r.p.m.

A first signal means for initiating operation of the motor 22 by the small pump 31 is provided by a limit switch 37 which is operable by an actuating element 38 secured to the tailstock assembly 14.

Second and third signal means for respectively reducing the operating speed of the motor 22 or stopping it completely are both provided by a pneumatic circuit indicated at 41. The pneumatic circuit 41 includes an air pump 42 which is communicated with a branched conduit 43 by a valve 44. The valve 44 is in turn positioned by an electrical solenoid indicated at A.

An indexing plate 46 is mounted for rotation with the chuck 12 and defines elongated apertures 47 and 48 which are axially and circumferentially offset with respect to each other. The branched conduit 43 includes a pair of outlet orifices 51 and 52 which are radially aligned with the apertures 47 and 48 respectively. Pressure responsive switches 53 and 54 are in respective communication with the orifices 51 and 52 for selective operation in a manner described in greater detail below. A conventional timer element 55 is electrically coupled with the switch 54 and associated with the solenoid V, Y, and A.

Figure 3:
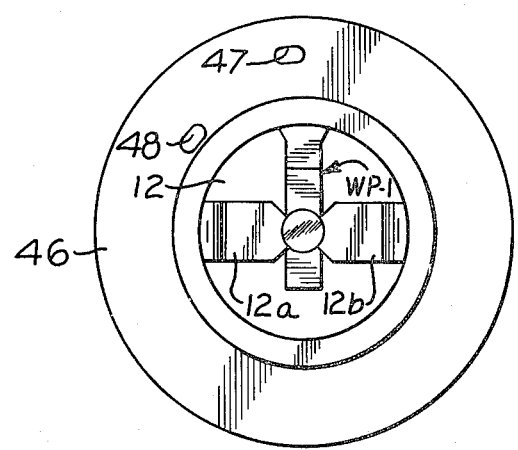
FIG. 3 is an enlarged view of an apertured plate mounted for rotation with the chuck.

Referring again to the friction welding machine illustrated in FIG. 1 and FIG. 2, the workpiece WP-1 and WP-2 are bonded together to form a single component as illustrated in FIG. 2. The workpiece WP-1 is of a configuration requiring selective orientation of the chuck 12 in order that it may be automatically placed in the chuck 12 at the beginning of a weld cycle. Accordingly, the indexing apparatus of the present invention functions in a manner described below to automatically rotate the chuck 12 to a selected angular position such as that illustrated in FIG. 3 so that it may receive the workpiece WP-1 by an automatic loading device (not shown). FIG. 3 further illustrates that the chuck 12 includes a pair of jaws 12a and 12b for securing the workpiece WP-1.

During a typical welding operation, after the workpieces WP-1 and WP-2 are bonded together, the workpiece WP-1 is released from the chuck 12 and the tailstock fixture 14 is retracted by the cylinder 16 to the position shown for removal of the workpiece WP-1 from the chuck 12. As the tailstock fixture 14 is retracted at the end of the welding cycle, the limit switch 37 is actuated by the member 38 and energizes the respective solenoids indicated at P, V, Y, and A. The solenoids V and Y respectively shift the control valves 32 and 33 to establish fluid communication between the pump 31 and the motor 22 and to permit outlet fluid from the motor to pass through both variable orifices 34 and 36. The motor 22 accordingly rotates the chuck 12 at a relatively higher speed until the aperture 47 is in alignment with the orifice 51.

Since the solenoid A is also energized, the valve 44 is positioned to communicate air pressure from the pump 42 into the branched conduit 43. Air pressure in the conduit immediately adjacent the orifice 51 is reduced as the aperture 47 enters into alignment therewith. This reduced pressure causes adjacent pressure switch 53 to close and accordingly deenergizes solenoid Y. Control valve 33 is accordingly shifted to interrupt communication of fluid across variable orifice 34. Outlet fluid from the motor 22 is now limited to the single variable orifice 36, so that the motor 22 operates at a relatively lower speed for exampale, approximately 20 r.p.m.

As the chuck 12 and plate 46 continue in rotation, the aperture 48 enters into alignment with the orifice 52. Reduced pressure upon the adjacent pressure switch 54 causes it to close and deenergize solenoid V. This, in turn, causes valve 32 to close.

At this point, it is again noted that switch 37 also energized solenoid P causing a valve 56 to communicate the pump 31 with a retarding or brake valve 57. Since valves 56 and 28 are integrally formed, valve 28 is shifted so that valve 27 is closed and pump 21 is blocked from motor 22.

As fluid communication between the pump 31 and motor 22 is interrupted, inertia of the motor 22, gear train 26 and chuck 12 tends to continue rotation of the motor 22. Since the motor is continuing in rotation but no fluid is being provided from the pump 31, the motor 22 acts substantially as a pump to produce fluid flow or pressure in a downstream conduit 22a which is in communication with a brake valve 57. The brake valve 57 is initially conditioned by the valve 56 to provide a relief pressure for the conduit 22a of approximately 800 psi for example. In view of pressure developed in the conduit 22a by continued rotation of the motor 22, the motor 22 is stopped almost immediately. Accordingly, the chuck 12 may be accurately stopped in a predetermined position to receive a new workpiece WP-1. It is also noted that, at this point of time corresponding to completion of a welder cycle, all of the valves and solenoids are conditioned to commence a new indexing operation as described above.

The indexing apparatus described above may be adjusted depending upon the selected operating parameters of the friction welding machine and the workpieces to be bonded during a weld cycle. For example, the variable orifices 34 and 36 provide means to adjust the speed of the motor 22 and spindle 17 during indexing operation by the pump 31.

Further, the plate 46 is replaceably mounted upon the chuck 12 and the outlet orifices 51 and 52 are preferably mounted upon adjustable brackets (not shown) in order to adapt the machine for different welding operation. Adjustment of the orifices 51 and 52 is generally required when the chuck 12 is rotated under increased inertia so that it tends to cause increased rotation of the motor 22 immediately after the pump 31 is placed out of communication with the motor 22.

It should be noted that the timer 55 is also energized by pressure switch 54. If pressure switch 54 is still closed after the period of time selected for the timer, then the timer deenergizes solenoid A, which closes valve 44. However, if the spindle 17 does not stop in the desired aligned position, then pressure switch 54 will reopen within the period of time selected for the timer. In that event, the timer will reenergize solenoids V and Y and initiate another orientation cycle.

In the FIG. 4 embodiment, the welding machine and the hydraulic circuit controlling the drive motor for the machine are substantially as described above while the pneumatic circuit 41 is replaced by a light-sensing electronic control circuit indicated at 61. Other than for the circuit 61, components of the FIG. 4 embodiment are indicated by primed numerals corresponding to the numerals employed in FIG. 2.

The circuit 61 includes two light-emitting sources 62 and 63 which are in respective radial alignment with the orifices 47' and 48'. Light sensitive switch means, partially shown at 64 and 66, are arranged in sensing relation with the respective sources 62 and 63 while the plate 46' is disposed therebetween.

The switch means 64 and 66 function similarly as the switch means 53 and 54 of FIG. 2 to selectively deenergize solenoids Y' and V' in the same manner as described above for the solenoids Y and V of FIG. 2. Timer 55' is effectively coupled with switch means 66 for regulation of solenoids V' and Y'.

What we claim is:
1. In a rotary machine tool having a chuck which is rotatable by a variable speed hydraulic motor, indexing apparatus for locating the chuck in a selected angular position, comprising
 a source of fluid under pressure,
 hydraulic control means for regulating operation of the hydraulic motor and including means for communicating selectively variable hydraulic fluid pressure to the hydraulic motor, first signal means to which the hydraulic control means is responsive for commencing operation of the hydraulic motor at a relatively high speed, second signal means to which the hydraulic control means is responsive, the second signal means including means for sensing a first angular position of the chuck and thereupon causing the hydraulic control means to operate the hydraulic motor at a reduced speed, third signal means associated with the hydraulic control means and including means for sensing approach of the chuck towards its selected angular position, and a valve included within the hydraulic control means and being responsive to the third signal means for closing a fluid outlet of the hydraulic motor and thereby braking the hydraulic motor to accurately stop the chuck in the selected angular position.

2. The indexing apparatus of claim 1 wherein the hydraulic control means comprises valve means responsive to the first and second signal means for establishing operating speed of the hydraulic motor.

3. The indexing apparatus of claim 1 wherein the rotary machine tool is a friction welding machine comprising a tailstock assembly which is movable toward and away from the chuck, the first signal means comprising switch means actuatable by retraction of the tailstock assembly away from the chuck upon completion of a friction welding operation.

4. The indexing apparatus of claim 3 wherein the second and third signal means respectively comprise pressure switch means associated with the control means, the sensing means of each signal means comprising a conduit in communication with a source of fluid pressure, the respective pressure switch means and an outlet orifice for the conduit being directed toward an apertured plate means mounted for rotation with the chuck.

5. The indexing apparatus of claim 3 wherein the second and third signal means respectively comprise separate light sensitive switch means associated with the control means and arranged opposite a respective light source, an apertured plate means being mounted for rotataion with the chuck and interposed between the light sensitive switch means and the light source.

6. The indexing apparatus of claim 1 wherein the rotary machine tool is a friction welding machine comprising a tailstock assembly which is movable toward and away from the chuck, the first signal means comprising switch means actuatable by retraction of the tailstock assembly away from the chuck upon completion of a friction welding operation.

7. The indexing apparatus of claim 6 wherein the motor means is a hydraulic motor, the control meansn comprising a hydraulic circuit for selectively and variably regulating operation of the hydraulic motor.

8. The indexing apparatus of claim 7 further comprising valve means responsive to the third signal means for closing a fluid outlet of the motor and thereby braking the motor to accurately stop the chuck in its selected angular position.

9. The indexing apparatus of claim 1 wherein the rotary machine tool is a friction welding machine.

10. The indexing apparatus of claim 1 wherein the signal means comprises a pressure switch means operatively coupled with the valve means, the sensing means comprising a conduit in communication with a pressure source, the pressure switch means and an outlet orifice, the outlet orifice being directed toward an apertured plate means mounted for rotation with the chuck.

* * * * *